July 26, 1960

C. TIFFANY 2,946,256

ANGULAR BEARING INSTRUMENT AND MECHANISM
FOR ANGULAR ADJUSTMENT

Filed July 9, 1958

INVENTOR
CARTER TIFFANY

ATTORNEY

July 26, 1960

C. TIFFANY 2,946,256

ANGULAR BEARING INSTRUMENT AND MECHANISM
FOR ANGULAR ADJUSTMENT

Filed July 9, 1958

INVENTOR
CARTER TIFFANY

ATTORNEY

United States Patent Office 2,946,256
Patented July 26, 1960

2,946,256

ANGULAR BEARING INSTRUMENT AND MECHANISM FOR ANGULAR ADJUSTMENT

Carter Tiffany, Annapolis, Md., assignor to Weems System Of Navigation, Inc., Annapolis, Md., a corporation of Maryland Filed July 9, 1958, Ser. No. 747,441

4 Claims. (Cl. 88—2.4)

This invention relates generally to angle determining apparatus, and more particularly to a position determining instrument employing an improved arrangement of mechanism for obtaining a desired angular relationship among relatively moving parts.

Many arrangements are known in the prior art for taking visual observations of fixed objects for the purpose of determining the angular orientation of the fixed object with respect to a given point. To facilitate making angular measurements with instruments of this type, a series of mirrors may be arranged for optically superimposing the image of a distant object with that of a second object in a manner which relates the angular orientation of the mirrors to the angular separation of the two objects. Arrangements of this type generally require that a mechanical movement be employed which rotates elements in the mirror system at half the angular displacement of the sighting member since the reflection of the distant object in the rotatable mirror results in the well known double-angle separation between the incident and reflected rays. Prior art arrangements for obtaining the true bearing angle from the reflected angle in the mirror instrument have employed scales which are laid out in half-degree intervals but which are calibrated as whole degrees, or have introduced a gear or linkage between the elements to produce the required two to one relationship between the angular movement of the components of the instrument.

The use of scales laid out in half degrees involves a certain sacrifice in the accuracy with which the instrument can be used. Since the scale calibration in whole degrees is, however, measuring half degrees, the instrument cannot be employed directly to measure angular displacements on a map or act as a protractor for transfering readings from the map to observations made or vice versa. Instruments which employ a gear ratio or suitable linkage between the movable elements for obtaining correct angular displacements are subject to the limitations imposed by back lash and other inaccuracies in the mechanical movement and generally involved complex mechanical elements which are expensive and relatively complex.

It is, accordingly, an object of the present invention to provide a new and improved angular position finding instrument.

Another object of the invention is to provide an improved mechanism for obtaining a desired relationship between relatively moving parts.

A further object of this invention is to provide a position finding instrument employing a new and improved mechanical relationship between the elements thereof.

A still further object of the invention is to provide a position finding instrument employing a mirror optical system for superimposing the images of objects between which the angular separation is to be determined and in which the true bearing of the objects can be obtained.

These and other objects of the present invention will become apparent from the following detailed description taken in conjunction with the accompanying drawings in which.

In the preferred embodiment of the present invention, a position finder is constructed with the parts thereof located relative to a fixed circle in a manner such that the radius of the circle may be moved to indicate bearing angle and a point connecting the periphery of the circle at the end of the radius with a predetermined second point on the periphery of the circle provides the requisite angular movement of a mirror pivoted at the second peripheral point.

Figure 1:
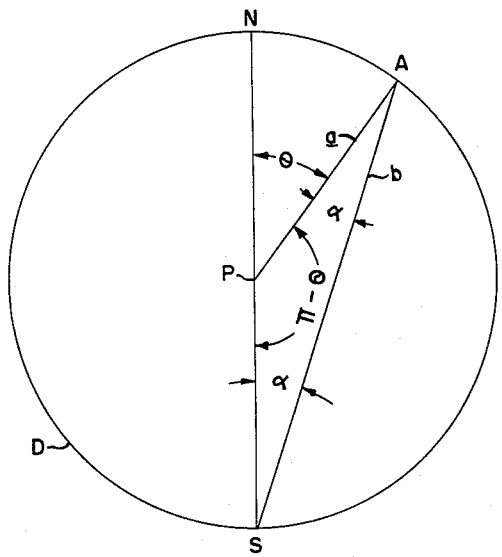
Fig. 1 is a geometrical diagram useful in describing the principle of the mechanical motion of the invention.

Referring now to Fig. 1, the geometrical relationship involved in the present invention may be described with respect to a circle D having a center P and a radius $a$. The circle D has a diameter NPS. The point A which is the end of the radius $a$ is connected to the point S by the line AS. Angle APN is designated as the angle $\theta$ and angle ASN is designated as angle $\alpha$. Angle $\alpha$ can be shown to be equal to one half angle $\theta$ as follows:

From inspection of the figure:

Angle $APS = \pi - \theta$

Triangle APS is an isosceles triangle since two of its sides are the radii PA and PS. Accordingly, angle PSA is equal to angle PAS and these angles are designated as $\alpha$ in Fig. 1.

For any triangle, the sum of the angles is equal to $\pi$. Accordingly:

$$\alpha + 2 + (\pi - \theta) = \pi$$

Therefore:

$$\alpha = \frac{\theta}{2}$$

Since the point A could be any point on the circumference, this angular relation between $\alpha$ and $\theta$ holds for any radius of the circle D.

Figure 2:
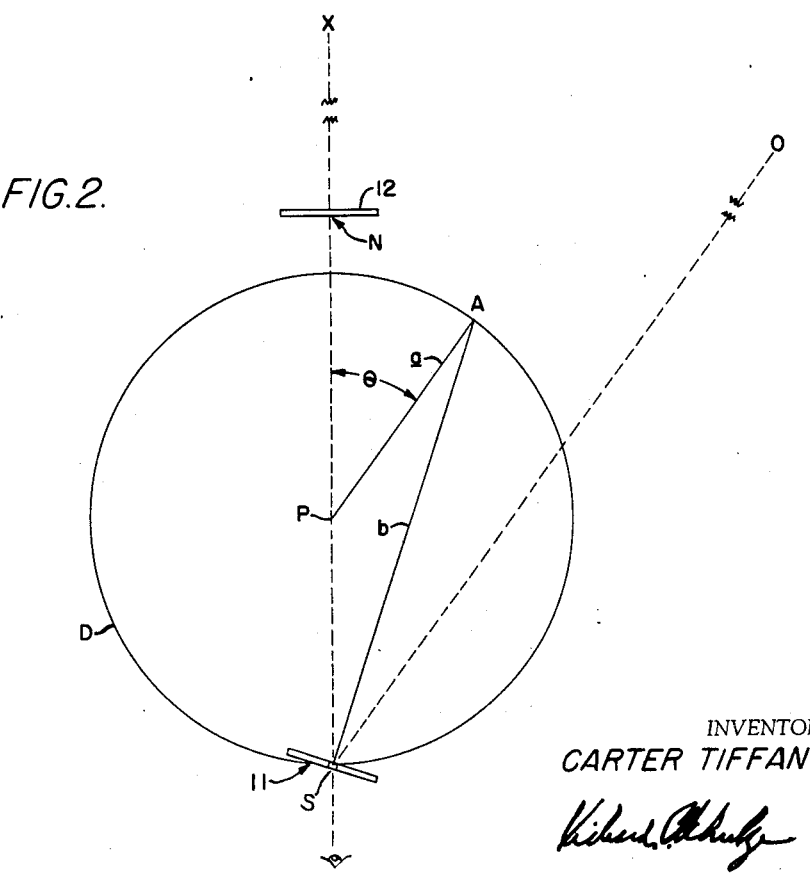
Fig. 2 is a plan view of a schematic representation of a position finding instrument in accordance with the principles of the present invention.

The application of the foregoing geometrical principle to a position finder is shown in Fig. 2. A mirror 11 is pivotally mounted at the point S on the circumference of circle D for rotation about an axis normal to the plane of the figure. A fixed mirror 12 is positioned perpendicular to a line drawn through the diameter of the circle which passes through the point S. If the rotation of the mirror 11 is constrained to be perpendicular to a line joining the pivot point S with any point A on the circumference of the circle D, the mirror will rotate through half the angular displacement of a radius PA, joining the center of the circle D with the point A. For this condition, an object O in the distance will be reflected by the mirror 11 into the mirror 12 and superimposed on the line coinciding with the diameter through the point S. With the image of O observed in mirror 12 from the point S, the radius PA will have an angular displacement $\theta$ which corresponds to the bearing angle to the point O. The bearing angle $\theta$ may be made relative to a reference direction along the diameter of the circle through the point S by sighting along the diameter to a distant object X. The preferred structure and the operation of an instrument of this type is set forth in greater detail with respect to the embodiment disclosed in Figs. 3 and 4.

Figure 3:
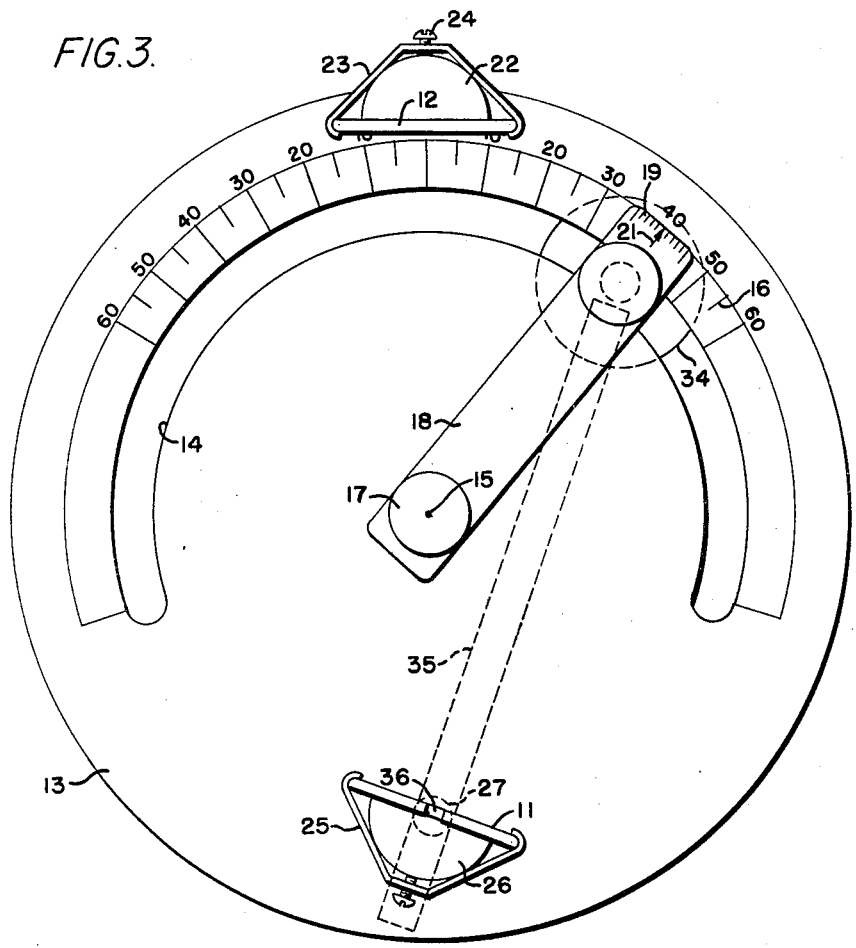
Fig. 3 is a plan view of an instrument made in accordance with the present invention.
Figure 4:
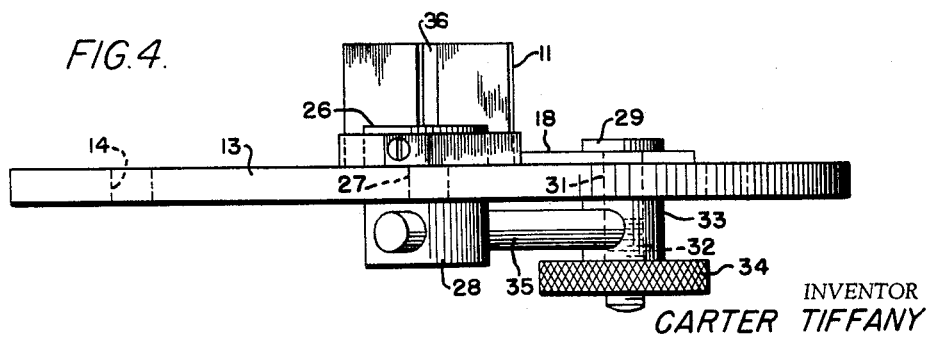
Fig. 4 is an elevational view of the instrument of Fig. 3 taken in the direction of the sighting axis.

Referring now to Fig. 3, a position finding instrument is shown comprising a base plate 13 which may be made of any suitable sheet material sufficiently thick to be self-supporting and may be, for example, a sheet of transparent plastic. For convenience, the base 13 may be shaped in the form of a circle, as shown. Accurately located on the base 13 is a circular slot 14 which has a center at the point 15. An angular degree scale may be suitably inscribed on the plate 13 adjacent the slot 14 setting off, for example, five degree intervals of arc for rotation about the axis through point 15.

Mounted on the plate 13 coaxially with the axis 15 is a pivot pin 17 upon which is rotatably mounted a radius arm 18 extending beyond the slot 14. For convenience in reading small angular divisions, the end of the radius arm 18 may be calibrated in a scale 19 set off in degrees and be five degrees wide on each side of a central index 21 for the purpose of reading the angular position of the arm 18.

A fixed mirror 12 is mounted near the edge of the plate 13 by means of any suitable attachment and adjustably supported with a bracket 23. The support 22 may comprise a circular post about which the angular position of the mirror 12 can be rotated by sliding the bracket 23 on the post 22 to obtain the desired position for the mirror 12 whereupon the bracket 23 and post 22 may be locked in fixed relation by any suitable means, such as a set screw 24.

Diametrically opposite the position of the mirror 12, the mirror 11 is rotatably mounted on the circle which coincides with the center line of slot 14. The mirror 11 may be supported by a bracket 25 secured to a circular post 26 in a manner similar to that described for the fixed mirror 12. The pivotal mounting for the mirror 11 and the linkage for moving the same can be further seen in Fig. 4 where the circular post 26 is secured to a pivot pin 27 which is accurately positioned for rotation about an axis normal to the circular center line of slot 14 on the plate 13 at the point diametrically opposite the fixed mirror 12. The pin 27 is retained on the plate 13 by being firmly secured to a block 28 which serves securely to mount the pin 27 for rotation on the plate 13. The pin 27 rotatably supports the mirror 11 and elements associated therewith as well as transmitting pivotal motion thereto as will be described in detail hereinafter.

The radius arm 18 is provided with clamping means for positioning it in fixed selected positions anywhere along the slot 14. For this purpose, the arm 18 is drilled to receive a bolt 29 having a shank portion 31 which makes a smooth sliding fit with the slot 14. A threaded end 32 of the bolt 29 passes through a cylindrical collar 33 and engages a threaded hand nut 34. The collar 33 is rotatably positioned on the shank of the nut 29 when the hand nut 34 is loosened sufficiently to prevent clamping engagement between the nut 34 and the head of the bolt 29 with the plate 13.

Secured to the collar 33 is a rod 35 which projects through a hole in the block 28 for a smooth sliding fit therewith. As best seen in Fig. 3, the rod 35 is accurately positioned between the axis of the bolt 29 at the end of the radius arm 18 and the axis of rotation for the pivot pin 27. Upon rotation of the radius arm 18 motion is transmitted to the rod 35 through the pivoted connection therebetween provided by the bolt 29. The angular position of the rod 35 rotates the block 28, pin 27 and therefore mirror 11 to maintain a position of mirror 11 perpendicular to the axis of the rod 35 due to the sliding connection of the rod 35 through the block 28.

To facilitate sighting with the instrument, mirror 11 is provided with a central slot 36 which is transparent and can therefore be used to view the fixed mirror 12 by positioning the observer's eye behind the slot 36 in the mirror 11.

The operation of the position finding instrument of the present invention can be illustrated for the case where the angular separation between two visible objects from the observer's position is desired to be known. To obtain this angular reading, the operator holds the instrument in a substantially horizontal position and sights through the slot 36 in the mirror 11 along the diameter toward one of the objects. The reflection of the slot 36 will be seen in the fixed mirror 12 and can be used as a sight to align the direction of the instrument toward the first object. The hand nut 34 is then loosened and the nut moved in a manner to rotate the radius arm 18 until the mirror 11 is rotated to a position where the second object can be seen reflected into the mirror 12 by the observer looking through the slot 36. With the first object aligned with the slot 36 and its reflection in mirror 12 and the second object reflected into mirror 12 as viewed through the slot 36, the hand nut is tightened and the angular bearing between the two distant objects from the position of the operator may then be read on the scale 16 opposite the index 21.

Many changes and modifications of the present invention will now be apparent in the light of the above teaching. For example, other instruments can be designed based on the principle of obtaining a double angle relationship between the rotation of the members as disclosed herein. The mechanical linkage for providing this angular relationship among the rotating parts may also be applied to other apparatus and mechanism for the purpose of obtaining a desired predetermined relationship between the rotating parts. Linkages for this purpose may be constructed without using a slotted plate for locking the parts in selected positions. Accordingly, such modifications and adaptations of the teachings of the present invention are to be considered within the scope of the invention as defined within the appended claims.

I claim:

1. A sighting protractor comprising, a base having a circular slot therein, a radius arm pivoted to the upper surface of said base at the circular center of said slot, a support pivoted on said base about an axis normal to said base and spaced from said center the radial distance to the middle of said slot, said support projecting through said base, a member secured to said arm and projecting through said slot, manually operable means attached to the portion of said member which projects below the under surface of said base for clamping said member to said base for restraining said arm, a rigid link having one end pivotally secured to said member between said operable means and the under surface of said base, the opposite end of said rigid link being in sliding engagement with the portion of said support which projects through said base for rotating said support without relative rotation between said support and said link, a first plane mirror mounted on said support adjacent to the upper side of said base and perpendicular to the longitudinal axis of said link, and a second plane mirror mounted on the upper side of said base diametrically opposite said first mirror perpendicular to said diameter.

2. A device according to claim 1 in which said first mirror has a sighting aperture therein on the axis of rotation of said support.

3. A device according to claim 2 in which said mirrors are both angularly adjustably on the supporting means for the respective mirrors.

4. Apparatus according to claim 2 in which said member is threaded and said manually operated clamping means is a hand nut.

References Cited in the file of this patent

FOREIGN PATENTS 9,600     Great Britain _____ of 1897